(12) United States Patent
Thornton et al.

(10) Patent No.: US 9,181,995 B1
(45) Date of Patent: Nov. 10, 2015

(54) METHOD OF CONTROLLING A TRANSMISSION CLUTCH

(71) Applicant: FORD GLOBAL TECHNOLOGIES, LLC, Dearborn, MI (US)

(72) Inventors: Sarah Thornton, Newark, CA (US); Diana Yanakiev, Birmingham, MI (US); Dimitar Petrov Filev, Novi, MI (US); Yan Wang, Ann Arbor, MI (US); Anuradha Annaswamy, W. Newton, MA (US); Gregory Michael Pietron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 14/261,504

(22) Filed: Apr. 25, 2014

(51) Int. Cl.
*F16D 48/02* (2006.01)
*F16D 48/06* (2006.01)
*F16D 25/06* (2006.01)

(52) U.S. Cl.
CPC .............. *F16D 48/066* (2013.01); *F16D 25/06* (2013.01)

(58) Field of Classification Search
None
See application file for complete search history.

(56) References Cited

U.S. PATENT DOCUMENTS

| | | | |
|---|---|---|---|
| 5,747,960 A | 5/1998 | Quaggio | |
| 8,271,171 B2 | 9/2012 | Terwart et al. | |
| 8,366,585 B2 | 2/2013 | Terwart et al. | |
| 2005/0071065 A1* | 3/2005 | Zimmermann | F16D 48/08 701/51 |
| 2006/0135316 A1* | 6/2006 | Fujii | F16H 61/061 477/156 |
| 2010/0204010 A1* | 8/2010 | Petzold | F16D 48/06 477/174 |
| 2010/0323845 A1 | 12/2010 | Miller et al. | |
| 2012/0130608 A1 | 5/2012 | Fujii et al. | |
| 2013/0153353 A1* | 6/2013 | Teslak | B60W 10/02 192/3.54 |

* cited by examiner

*Primary Examiner* — Edwin A Young
(74) *Attorney, Agent, or Firm* — James Dottavio; Brooks Kushman P.C.

(57) ABSTRACT

A hydraulically actuated clutch is controlled based on a mathematical model that predicts the position of the clutch piston based on the profile of the commanded pressure over time. During a clutch engagement, a set of delays associated with the preparatory phase of engagement are measured and compared to predicted values. Model parameters are then adaptively adjusted based on the differences between the measured and predicted delays and on an estimate of the sensitivities between model parameters and the delays. Subsequent engagements are controlled based on the updated mathematical model to reduce the delays. Changes in the measured delays following adaptation of the model parameters are utilized to update the estimate of the sensitivities.

15 Claims, 8 Drawing Sheets

METHOD OF CONTROLLING A TRANSMISSION CLUTCH

TECHNICAL FIELD

This disclosure relates to the control of automatic transmission clutches. More particularly, the disclosure pertains to a method of adaptively modifying a mathematical model of the clutch and utilizing the model to control clutch engagement.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many automatic transmissions implement a discrete number of different transmission ratios in which each ratio is establish by engaging a particular subset of clutches. A clutch that selectively holds a gearing element against rotation may be called a brake. Some clutches may be actively controlled such as by hydraulic actuation. Other clutches may be passive devices such as one way clutches. To shift from one speed ratio to another speed ratio, one clutch is engaged and another clutch is released. The engagement of the oncoming clutch must be coordinated with the release of the off-going clutch. If the off-going clutch is released before engaging the oncoming clutch, the transmission would temporarily be in a neutral state in which no power is transferred. On the other hand, if there is too much overlap, the transmission will be in a tie-up state. Coordination is much easier when the off-going clutch is a passive device such as a one-way clutch which automatically releases as the oncoming clutch attains sufficient torque capacity.

SUMMARY OF THE DISCLOSURE

A transmission includes a hydraulically actuated clutch and a controller programmed to estimate a position of a clutch piston based on a model and to adaptively adjust the model based on measured time delays. The model may be adjusted by changing the values of model parameters such as lumped flow coefficients or spring preload forces. The updates may be based on an estimate of the sensitivities of the delays to changes in model parameters. The sensitivity estimates may themselves also be updated based on the measured delays. The delays may be measured, for example, using a torque sensor that measures a shaft torque which changes in response to changes in the torque capacity of the clutch.

A method of controlling a clutch includes using a model to estimate a set of delays between initiating engagement and changes in the relationship between torque capacity and commanded pressure, then measuring the delays, then updating model parameters, and then controlling subsequent shifts based on the revised model to reduce the delays. The parameters may be updated based on the differences between the estimated and the measured delays and on an estimate of the sensitivities of the delays to changes in model parameters. Following subsequent engagements, the estimates of the sensitivities may also be updated. Using this method, the controller can update the model parameters following an upshift that does not include an engine flare such that the delay during a subsequent engagement is reduced.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
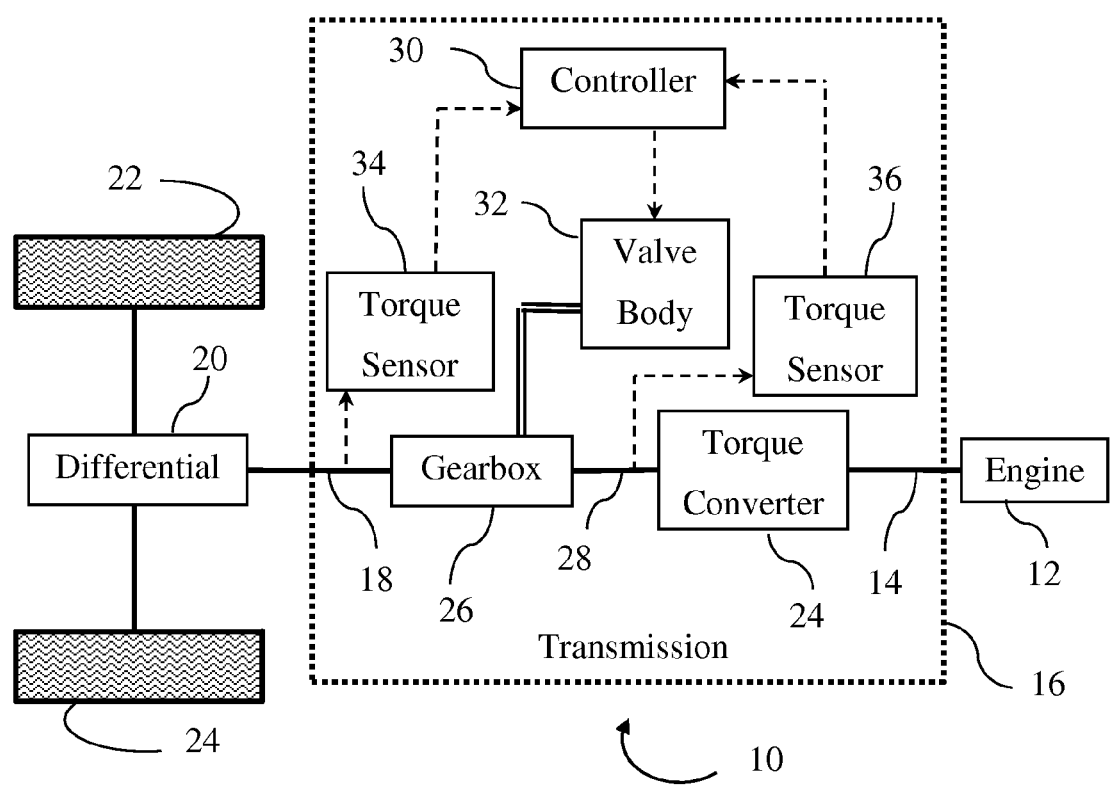
FIG. 1 is a schematic of a vehicle powertrain suitable for use with the disclosed method.

A powertrain of a vehicle 10 is illustrated schematically in FIG. 1. Solid lines indicate mechanical connections. Broken lines represent the flow of signals. Double lines represent the flow of fluid. Engine 12 provides power to rotate crankshaft 14. Transmission 16 transits the power from crankshaft 14 to driveshaft 18 while potentially modifying the speed and torque to be more suitable to the present vehicle requirements. Differential 20 distributes the power to a left wheel 22 and a right wheel 24 while permitting slight speed differences between the wheels such as when the vehicle turns a corner.

The transmission includes a torque converter 24 and a gearbox 26. The torque converter transmits the power from crankshaft 14 to turbine shaft 28. Gearbox 26 transmits the power from turbine shaft 28 to driveshaft 18. Controller 30 sends signals to valve body 32 causing valve body 32 to send pressurized fluid to clutches in gearbox 26. The gear ratio of gearbox 26 depends upon which subset of the clutches are provided with pressurized fluid. Controller 30 utilizes many inputs to determine what commands to send to valve body 32 including signals from output torque sensor 34 and turbine torque sensor 36.

Figure 2:
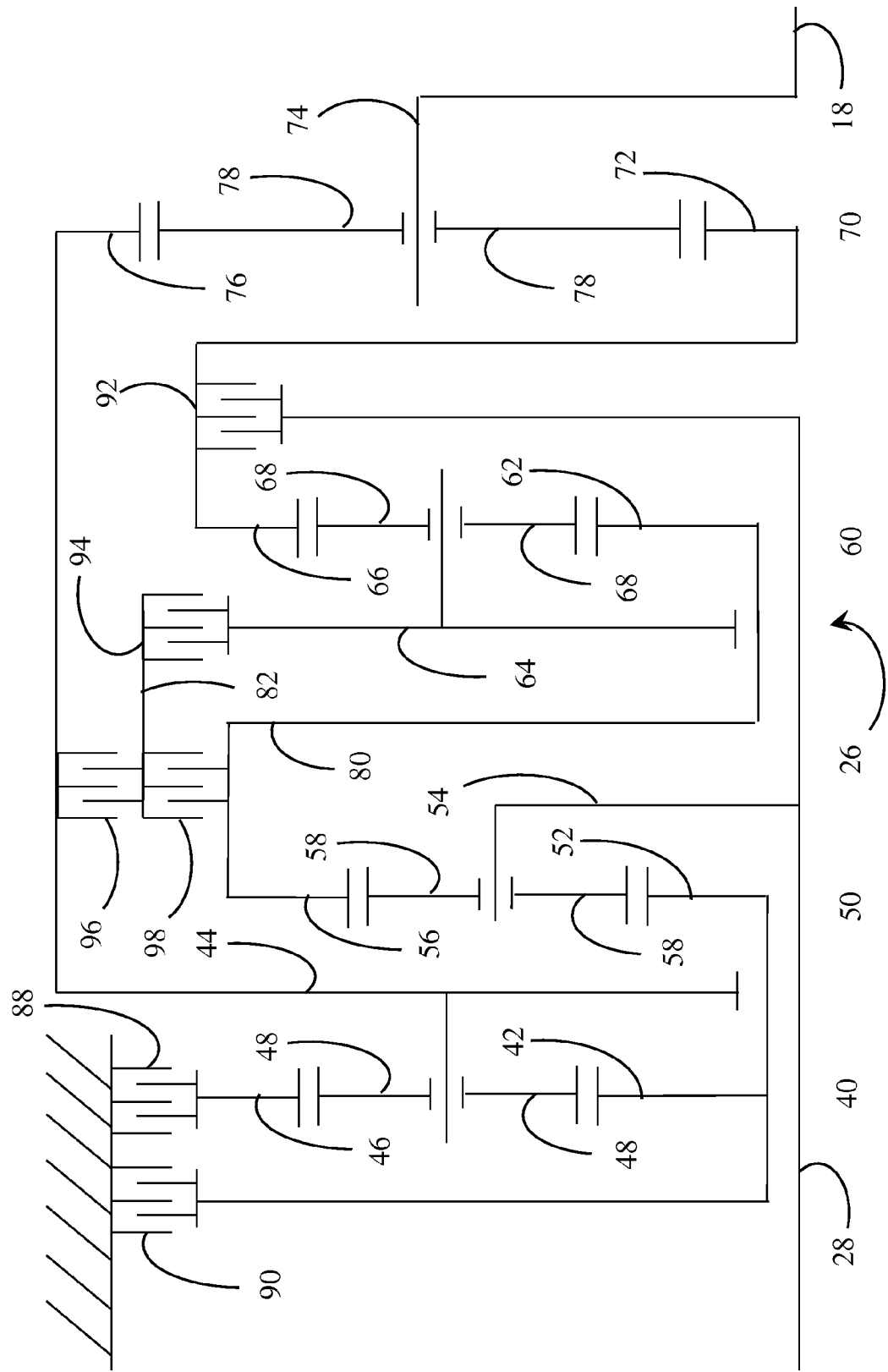
FIG. 2 is a schematic diagram of an exemplary transmission gearing arrangement suitable for use with the disclosed method.

An example gearbox is schematically illustrated in FIG. 2. The proposed method is applicable to a wide variety of gearbox arrangements. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

|  | 88 | 90 | 92 | 94 | 96 | 98 | Ratio | Step |
|---|---|---|---|---|---|---|---|---|
| Rev | X | X |  | X | X |  | −4.79 | 102% |
| 1st | X | X | X | X |  |  | 4.70 |  |
| 2nd | X | X |  | X |  | X | 2.99 | 1.57 |
| 3rd | X |  | X | X |  | X | 2.18 | 1.37 |
| 4th | X |  |  | X | X | X | 1.80 | 1.21 |
| 5th | X |  | X |  | X | X | 1.54 | 1.17 |
| 6th | X |  | X | X | X |  | 1.29 | 1.19 |
| 7th |  |  | X | X | X | X | 1.00 | 1.29 |
| 8th |  | X | X | X | X |  | 0.85 | 1.17 |
| 9th |  | X | X |  | X | X | 0.69 | 1.24 |
| 10th |  | X |  | X | X | X | 0.64 | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

Figure 3:
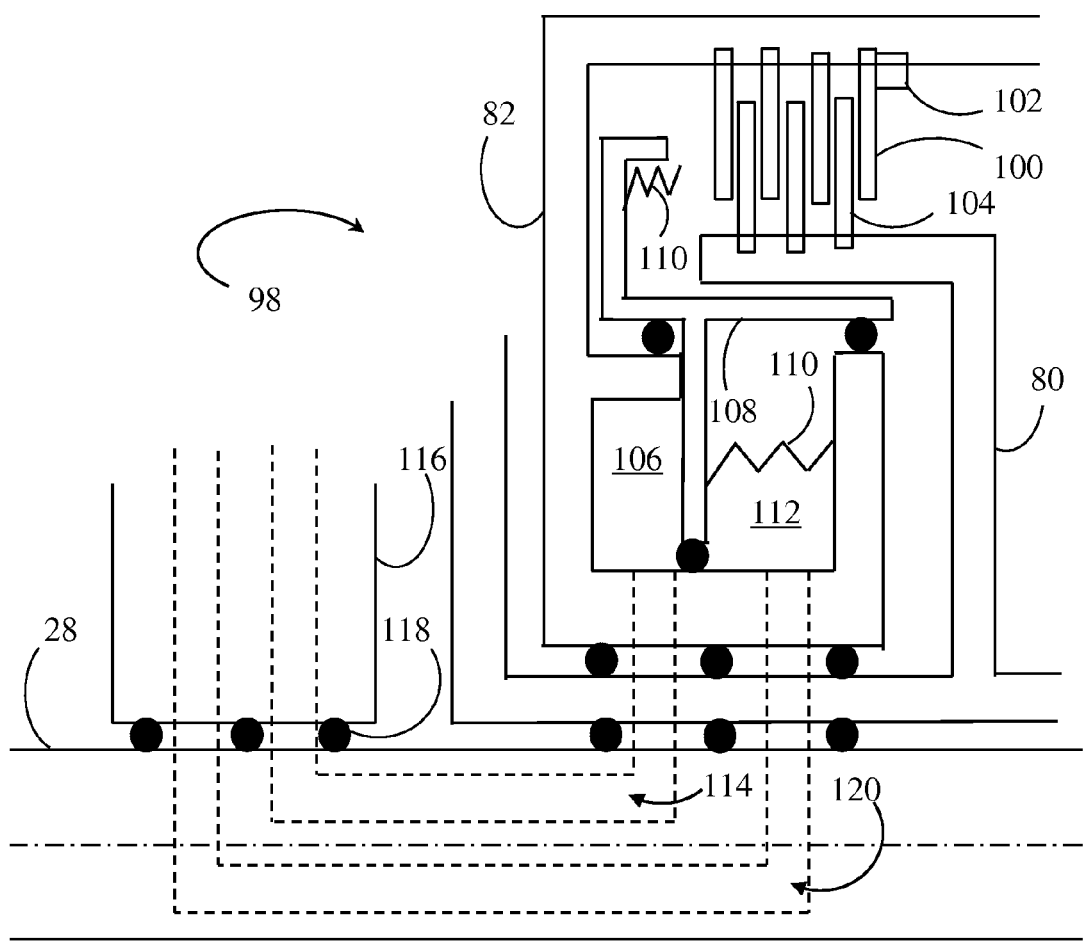
FIG. 3 is a cross sectional view of a transmission clutch in a fully open position.

FIG. 3 shows a cross section of clutch 98. Clutch housing 82, the intermediate element in FIG. 2, is supported to rotate around shaft 80, which is, in turn, supported to rotate around turbine shaft 28. A set of separator plates 100 are splined to housing 82 such that they rotate with housing 82 but are free to slide axially. Snap ring 102 restrains the axial movement toward the right. A set of friction plates 104 are splined to shaft 80 and are interleaved with the separator plates 100. The friction plates and separator plates may collectively be referred to as a clutch pack. When pressurized hydraulic fluid is routed to apply chamber 106, piston 108 slides axially with respect to housing 82. After piston 108 moves into contact with the clutch plate, the force squeezes the friction plates and separator plates together. Friction between the friction plates and separator plates transmits torque between housing 82 and shaft 80. The maximum amount of torque that can be transmitted at a given moment is called the torque capacity. Isolation spring 110 contacts the clutch pack slightly before the piston itself smoothing the transition. When the pressure in apply chamber 106 is relieved, return spring 112 pushes piston 108 away from the clutch pack to release the clutch. When clutch housing 82 rotates, centrifugal force tends to increase the pressure of fluid in apply chamber 106 which tends to engage the clutch. To avoid unintentional engagement, unpressurized fluid is routed to balance chamber 112. Centrifugal force pressurizes the fluid in the balance chamber, counteracting the force generated by centrifugal force in the apply chamber.

Controller 30 regulates the current (or pulse width) to a solenoid in valve body 32 such that the pressure in a particular channel within valve body is regulated to a commanded pressure. The fluid then flow from the valve body to apply chamber through passageway 114. Passageway 114 goes through front support 116, through turbine shaft 28, through shaft 80, and into housing 82. Since these components rotate at different speeds, seals 118 are used to route fluid from one component to another component. Similarly, the unpressurized fluid is routed to balance chamber 112 through passageway 120. Due to the resistance of passageways 114 and 120, the pressure in apply chamber 106 is not always equal to the commanded pressure in the valve body. When fluid is flowing from the valve body to the apply chamber, the pressure in the apply chamber will be less than the commanded pressure. The pressure is higher in the apply chamber when the fluid is flowing the opposite direction. During a preparatory phase of a shift, the controller adjust the commanded pressure to move the piston into contact with the clutch pack. In the absence of a measured feedback signal during this phase, the controller must utilize a mathematical model to determine the axial position of the clutch piston.

Although many factors influence the axial position of the clutch piston, the axial position of the clutch piston can be modeled with sufficient accuracy using a lumped parameter model. This model is described in detail in U.S. patent application Ser. No. 13/766,829 which is incorporated by reference herein. Specifically, the flow rate, Q, may be predicted based on pressure difference, ΔP, using the formula:

$$Q = K_1 * \Delta P + K_2 * \sqrt{\Delta P}$$

where $K_1$ and $K_2$ are lumped flow coefficients. The pressure difference is defined by the formula:

$$\Delta P = P_{cmd} - P_{apply}$$

where $P_{cmd}$ is the commanded pressure and $P_{apply}$ is the pressure in the apply chamber. The flow rate is related to the rate of movement of the clutch piston by the formula:

$$\dot{x} = -Q/A$$

where A is the area of the clutch piston and x is the distance between the piston and the clutch pack. When the clutch is fully applied, x=0. When the clutch is fully released, x=$x_{max}$. In between these two conditions, the clutch position may be estimated by integrating Q/A.

The relationships among x, $P_{apply}$, and the clutch torque capacity, T, vary based on clutch position. In region 1, when the clutch is fully released as shown in FIG. 3:

$$P_{apply} = \frac{1}{A} * (F_0 - K_{rs} * x_{max})$$

$$T = 0$$

where $F_0$ is the return spring force when the clutch is fully applied and $K_{rs}$ is the spring rate of the return spring.

Figure 4:
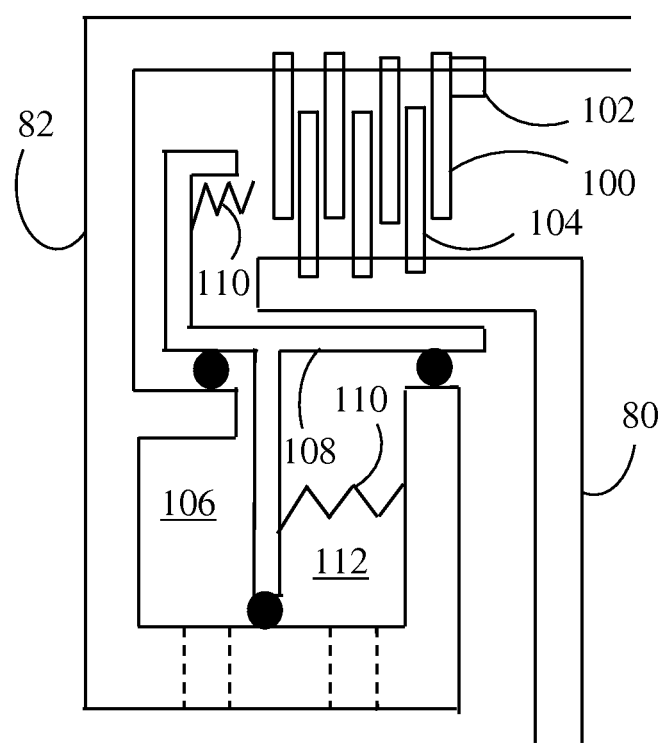
FIG. 4 is a cross sectional view of the clutch of FIG. 3 in a first partially stroked position.

When $P_{cmd}$ exceeds $P_{apply}$, the clutch piston moves into region 2, as illustrated in FIG. 4. In region 2, the clutch has moved from the fully open position but the isolation spring is not in contact with the clutch pack. Region 2 is governed by the equations:

$$P_{apply} = \frac{1}{A} * (F_0 - K_{rs} * x)$$

$$T = 0.$$

Figure 5:
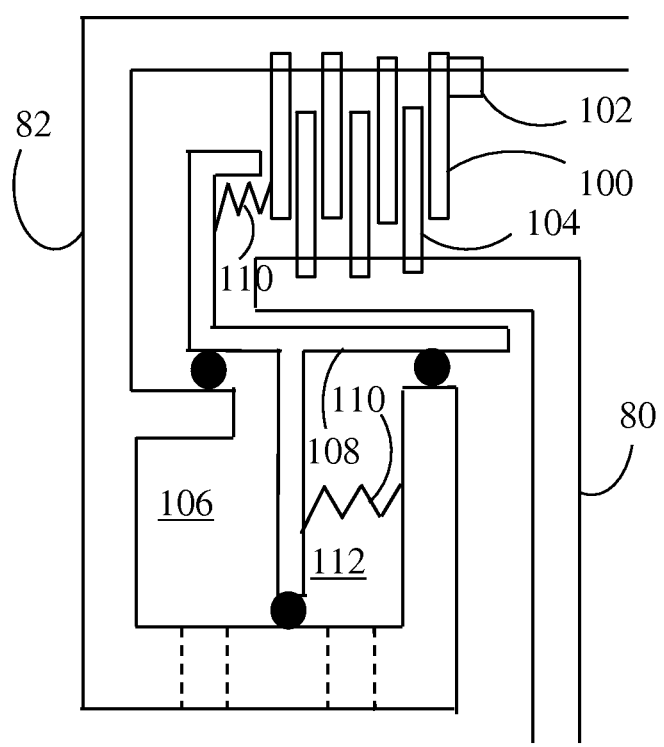
FIG. 5 is a cross sectional view of the clutch of FIG. 3 in a second partially stroked position.

When x becomes less than the free length of the isolation spring, $x_{is}$, as shown in FIG. 5, then the region 3 equations apply:

$$P_{apply} = \frac{1}{A} * (F_0 + K_{is} * x_{is} - (K_{rs} + K_{is}) * x)$$

$$T = K_{is} * (x_{is} - x) * 2 * N * \mu * r$$

where $K_{is}$ is the spring rate of the isolation spring, N is the number of friction plates in the clutch pack, μ is the friction coefficient, and r is the effective radius of the clutch pack.

Figure 6:
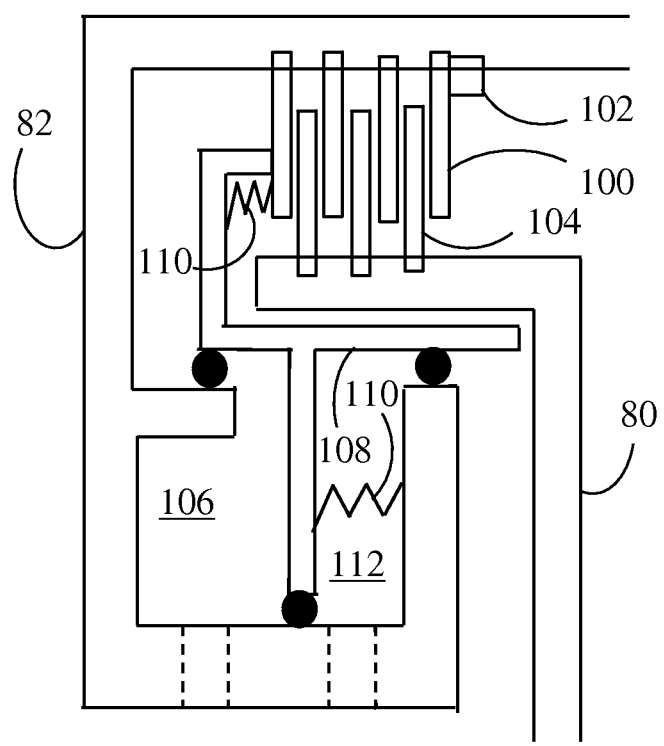
FIG. 6 is a cross sectional view of the clutch of FIG. 3 in a fully stroked position.

Finally, when x=0 as shown in FIG. 6, the piston is in contact with the clutch pack and the region 4 equations apply. In region 4, the pressure response can be represented with a first order transfer function featuring time constant $t_p$ and a delay $t_d$.

$$\frac{P_{apply}}{P_{cmd}}(s) = \frac{1}{1 + t_p * s} * e^{(-t_d * s)}$$

$$T = (A * P_{apply} - F_0 - K_{is} * x_{is}) * 2 * N * \mu * r$$

Many of the parameters of the mathematical model described above will fluctuate between transmissions of the same design due to manufacturing variability. Furthermore, many of the parameters will fluctuate over time due to transmission wear and due to variation in operating conditions. For example, the flow coefficients $K_1$ and $K_2$ depend on the viscosity of the fluid, which depends strongly on temperature among other factors. This unknown variation may cause the clutch piston position predicted by the mathematical model to differ slightly from the actual clutch piston position.

Figure 7:
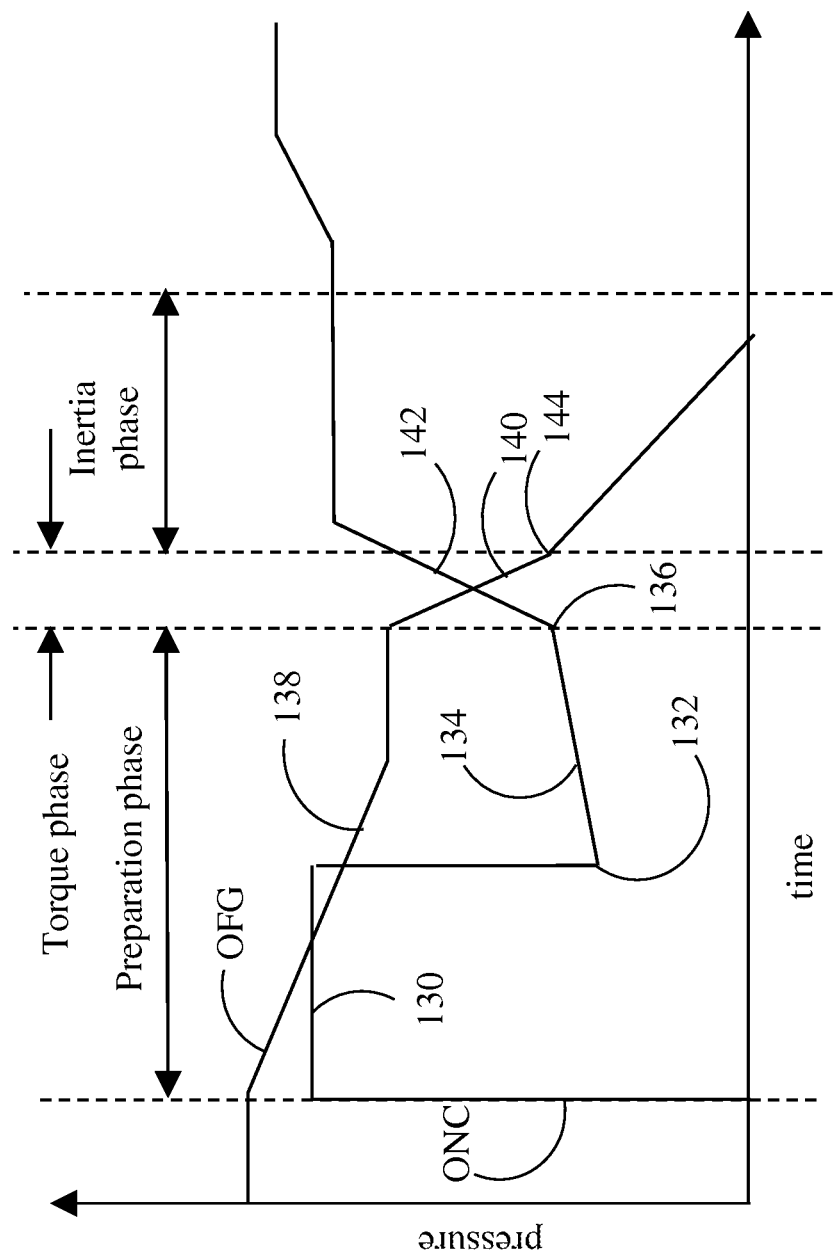
FIG. 7 is a graph of commanded clutch pressures during a synchronous upshift.

FIG. 7 illustrates commanded pressure profiles for the oncoming clutch (ONC) and the off-going clutch (OFG) during a synchronous upshift. After the shift scheduling algorithm, or a driver command, indicates that an upshift should be performed, the controller strokes the oncoming clutch during a preparatory phase. At 130, the pressure to the oncoming clutch is raised to a boost level for a boost duration. The purpose of the boost phase is to move the clutch piston as rapidly as possible from the disengaged position to the stroked position. The boost duration is generally selected such that the boost phase ends slightly before the piston is stroked. Then, at 132, a holding pressure is commanded. The holding pressure is generally selected to approximate the apply chamber pressure that would overcome the return spring and the isolation spring forces with the piston in the fully stroked position. Then, at 134, the commanded pressure is gradually increased to gently move the piston into the fully stroked (region 4) position. The preparatory phase ends when the piston of the oncoming clutch is fully stroked at 136. During this time, the commanded pressure for the off-going clutch may be reduced, as shown at 138, such that the torque capacity is equal to the torque actually transmitted by the off-going clutch. Throughout this preparatory period, neither the torque ratio nor the speed ratio change. However, the controller can predict the position of the oncoming clutch piston using the mathematical model as describe in U.S. patent application Ser. No. 14/036,316 which is incorporated by reference herein. When this preparatory period lasts too long, the transmission appears to the driver to be unresponsive.

Once the preparatory phase is complete, the torque transfer phase is executed by gradually reducing the commanded pressure of the off-going clutch as shown at 140 and gradually increasing the commanded pressure to the oncoming clutch as shown at 142. During this phase, the torque ratio gradually decreases to the upshifted value. Ideally, the speed ratio remains constant, although it can increase if the off-going clutch is released too quickly compared to the rate at which the oncoming clutch is engaged. Once the torque capacity of the off-going clutch reaches zero at 144, the inertia phase begins. During the inertia phase, the torque capacity of the oncoming clutch acts to slow the input, gradually decreasing the speed ratio to the upshifted value.

Shift quality suffers if the boost duration or holding pressure are selected improperly. If the boost duration is too long, it may continue after the clutch is fully stroked. If this happens, the oncoming clutch will have significant torque capacity before the controller begins releasing the off-going clutch. The resulting tie-up condition results in an abrupt drop in the torque ratio and a rough shift. Similarly, if the holding pressure is too high, the torque capacity will increase rapidly as the stroke position is reached, resulting in a tie-up condition and a drop in torque ratio. On the other hand, if the boost duration is too short or the holding pressure is too low, then the piston will not yet be at the stroke position when the controller begins the torque phase. The torque capacity will not ramp up as expected but will instead remain at zero until the clutch reaches the stroke position. In the interim, since the off-going clutch is being released, the input speed will increase in a phenomenon called an engine flare.

Traditionally, feedback signals from speed sensors have been used to adapt the boost duration and the holding pressure. If a flare is detected, the boost duration or the holding pressure is increased. Unfortunately, speed sensors do not indicate tie-up conditions, so they do not provide useful feedback for determining that the boost duration or the holding pressure are too high. Instead, the controller must gradually decrease these values until a flare is detected. Use of speed signals to adapt the boost duration and holding pressure requires periodic bad shifts.

The transmission is equipped with one or more torque sensors which measure the torque transmitted by one or more shafts, respectively. At least one of these shafts is selected such that the shaft torque changes in response to a change in the torque capacity of the incoming clutch. For example, the torque sensor may be located on a turbine shaft, an output shaft, or on the clutch itself. U.S. Pat. No. 8,510,003 describes a method of computing clutch torque capacity based on torque sensor readings. When the torque capacity begins to change with piston displacement, the controller can conclude that the piston has transitioned from region 2 to region 3. When the piston transitions from region 3 to region 4, the torque capacity begins to increase much more rapidly. The time delay between initiating the shift event and transitioning from region 2 to region 3 is called $t_{23}$. Similarly, the time delay between initiating the shift event and transitioning from region 3 to region 4 is called $t_{34}$.

A mathematical model of the clutch, as described above, can be used to estimate $t_{23}$ and $t_{34}$. The difference between the estimates and the measured values can be used to revise the parameters of the mathematical model. Let the measured values for the nth shift event be called $t_{23}(n)$ and $t_{34}(n)$. The model based predictions will be called $\widehat{t_{23}}(n)$ and $\widehat{t_{34}}(n)$, respectively. In matrix notation, the error vector is:

$$e(n) = \begin{bmatrix} \widehat{t_{23}}(n) - t_{23}(n) \\ \widehat{t_{34}}(n) - t_{34}(n) \end{bmatrix}.$$

The set of parameters to be adapted are denoted by the vector u. For example, if the two lumped flow parameters, $K_1$ and $K_2$, are the only parameters to be adapted, then:

$$u = \begin{bmatrix} K_1 \\ K_2 \end{bmatrix}.$$

If these parameters are changed by an amount $\Delta u$, then the error will change by an amount, $\Delta e$ as approximated by the equation:

$$\Delta e = J * \Delta u$$

where J, called the Jacobian, indicates the sensitivity of the delays to changes in the model parameters. In this example, $$J = \begin{bmatrix} \frac{\partial t_{23}}{\partial K_1} & \frac{\partial t_{23}}{\partial K_2} \\ \frac{\partial t_{34}}{\partial K_1} & \frac{\partial t_{34}}{\partial K_2} \end{bmatrix}.$$

In this example, since the dimensions of $\Delta u(n)$ and $\Delta e(n)$ are identical, there is a unique $\Delta u$ such that $e+\Delta e=0$. Theoretically, adjusting u by this amount would completely eliminate the error. However, adjusting model parameters too rapidly may cause instability and excessive variation among shifts. Therefore, a maximum change may be imposed. Also, there may be minimum and maximum values for each parameter. If a solution cannot be found subject to these constraints, then the value of $\Delta u$ that minimizes $|e+\Delta e|$ subject to the constraints is selected. The parameters are then adjusted accordingly and future shifts are controlled based on the piston position as predicted by the mathematical model.

The method is not limited to problems in which the dimensions of $\Delta u$ and $\Delta e$ are identical. If there are more parameters to adapt, such as the return spring pre-load force $F_0$, then it is possible that multiple solutions would exist such that $e+\Delta e=0$. In this case, the solution that minimizes the amount of change in the parameters is selected. As with the case of equal dimensions, there may be no solutions that satisfy the constraints in which case the solution that minimizes the error subject to the constraints is selected. If there are fewer parameters to adapt than measured delays, then constrained optimization is used.

An advantage of adapting model parameters using measured delays based on torque measurements is that the system can adapt following a shift that does not induce an engine flare or other degradation in shift quality measurable with a speed sensor. For example, if the current model parameters predict that the clutch will move faster than it actually does move, then the piston will not yet be in the stroke position after the predicted delay. If the controller were relying exclusively on speed sensors for feedback, it would have no way of knowing that the piston was not yet stroked and would begin the torque transfer phase. Since the oncoming clutch piston is not yet stroked, the torque capacity would not increase as expected and an engine flare would result as the off-going clutch is gradually released. However, with the proposed system, the controller will know based on torque sensor feedback that the oncoming clutch piston is not yet stroked. Therefore, it will wait to begin the torque transfer phase until the piston is stroked. Although the torque transfer phase will begin later than optimal, it will not produce an engine flare event. Following the shift, the controller will adapt model parameters to improve the estimation of piston position. The next time the oncoming clutch is engaged, the controller will use a longer boost duration or a higher stroke pressure, reducing the delay.

Due to the non-linearity of the system, a change in the model parameters may result in a change in the Jacobian. Even if the sensitivity of the underlying system has not changed significantly, the change in response due to a change in model parameters may provide an opportunity to refine the current estimate of the Jacobian matrix. A method based on Kalman filtering to update the Jacobian based on updated measurements is discussed in detail in U.S. Pat. No. 6,701,193.

Figure 8:
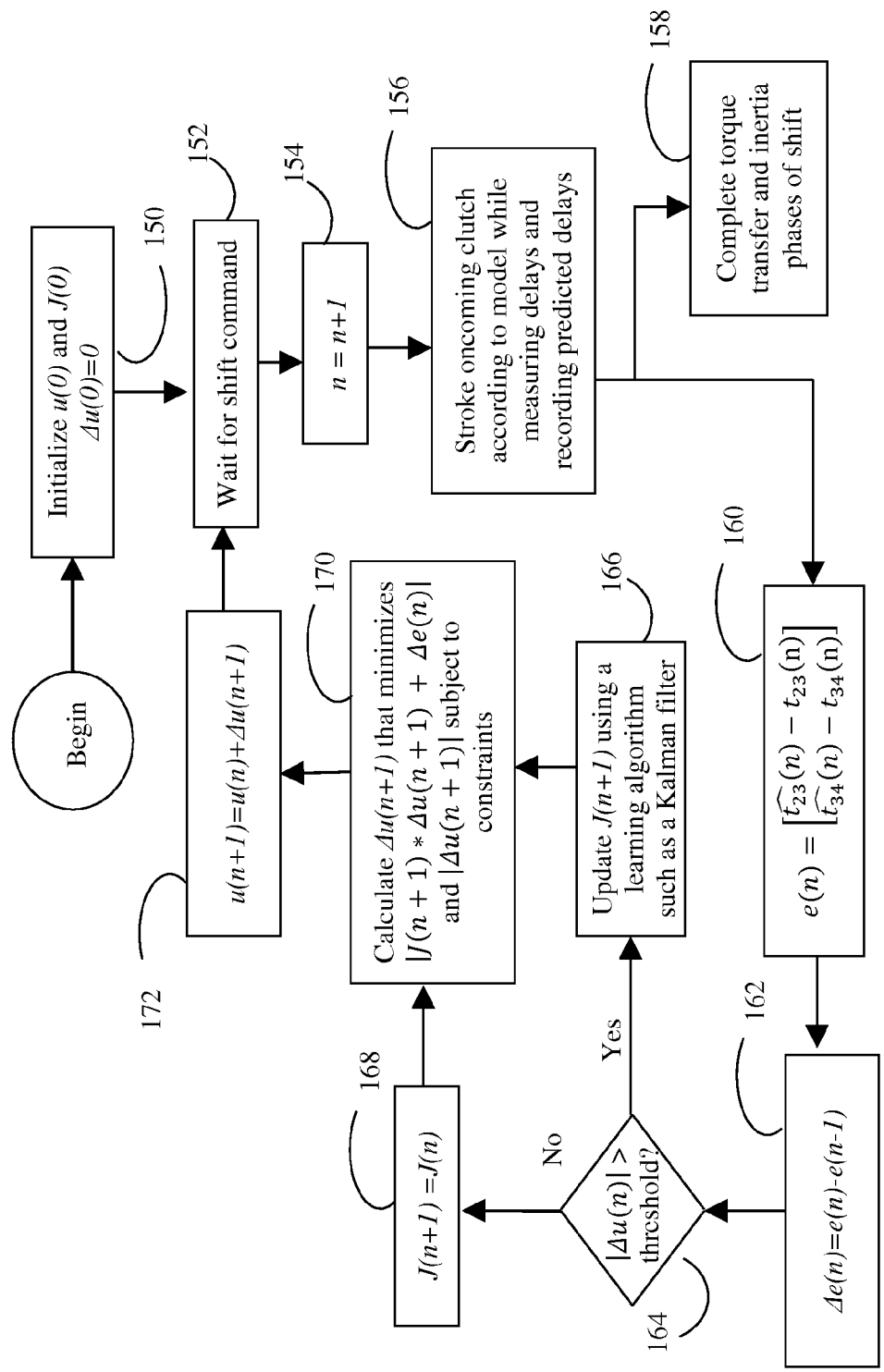
FIG. 8 is a flow chart illustrating the disclosed method.

FIG. 8 illustrates an adaptive clutch control method. Initial values are set for various parameters at 150. When an upshift is scheduled at 152, the iteration counter is incremented at 154. At 156, the pressure to the oncoming clutch is controlled to stroke the piston based on the position as predicted by the model. During the preparatory phase, the controller keeps track of the starting time of the boost phase, the time that torque capacity is first detected, and the time that torque capacity begins to respond linearly to pressure commands. The differences between these times indicate the delays $t_{23}(n)$ and $t_{34}(n)$. At 158, the controller completes the torque transfer phase and inertia phases of the shift. The error vector and change in error vector are computed at 160 and 162.

At 164, the controller checks to see if the model parameters have changed by enough to justify revising the estimate of the Jacobian. If the parameters have changed by enough, the Jacobian is updated at 166. If not, the previous Jacobian is carried over at 168. At 170 and 172, the controller determines the revised model parameters as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   a hydraulically actuated clutch having a piston;
   a model for estimating an axial position of the piston during a preparatory phase of a shift while a torque capacity of the clutch is zero; and a controller adapted to measure a time delay between a beginning of the preparatory phase and onset of torque capacity, and to update the model based on the measured time delay.

2. The transmission of claim 1 further comprising a torque sensor configured to measure a shaft torque wherein, during a torque transfer phase of the shift, the shaft torque changes in response to changes in the torque capacity of the clutch.

3. The transmission of claim 1 wherein the controller is programmed to update the model by revising a value of a model parameter.

4. The transmission of claim 3 wherein the model parameter represents a lumped flow coefficient.

5. The transmission of claim 3 wherein the model parameter represents a spring preload force.

6. The transmission of claim 3 wherein the controller is programmed to update the model parameter based on an estimate of a sensitivity of the delay to changes in the parameter.

7. The transmission of claim 6 wherein the controller is further programmed to measure the delay during subsequent engagement of the clutch, and then update the estimate of the sensitivity based on the measured delay of the first engagement, the measured delay of the subsequent engagement, the original model parameter value, and the updated model parameter value.

8. A method of controlling a clutch comprising:
during a drive cycle, estimating, based on a model, a set of delays between initiating engagement of the clutch and changes in a torque capacity to pressure relationship;
during a first clutch engagement, measuring the set of delays;
updating a set of model parameters based on differences between the estimated delays and the measured delays; and
during a subsequent engagement of the clutch, commanding a pressure to the clutch based on the updated set of model parameters such that at least one delay in the set of delays is reduced.

9. The method of claim 8 wherein the set of model parameters is updated based on an estimate of sensitivities of the delays to changes in the model parameters.

10. The method of claim 9 further comprising:
during the subsequent engagement of the clutch, measuring the set of delays; and
updating the estimate of the sensitivities based on the measured delays of the first engagement, the measured delays of the subsequent engagement, the original parameter values, and the updated parameter values.

11. The method of claim 8 wherein the set of delays includes a delay between initiating engagement and contact between a clutch piston and a clutch pack.

12. The method of claim 8 wherein the set of delays includes a delay between initiating engagement and contact between an isolation spring and a clutch pack.

13. The method of claim 8 wherein the model predicts a position of a piston as a function of a commanded pressure time profile.

14. A method of controlling a transmission comprising:
during a first positive torque upshift event,
i) commanding an oncoming clutch pressure such that a piston of an oncoming clutch is stroked after a first delay, and
ii) after the first delay, reducing an off-going clutch pressure to zero while maintaining a constant ratio of an input speed to an output speed; and
during a next engagement of the oncoming clutch, commanding the oncoming clutch pressure such that the piston of the oncoming clutch is stroked after a second delay less than the first delay.

15. The method of claim 14 further comprising:
measuring a shaft torque, wherein the shaft torque changes in response to changes in a torque capacity of the oncoming clutch.

* * * * *